March 31, 1970  ICHIZO TSURUMOTO  3,503,430
ANNULAR SPRING LOCK WASHER

Filed Nov. 19, 1968  3 Sheets-Sheet 1

ICHIZO TSURUMOTO,
INVENTOR

BY Wenderoth, Lind & Ponack,
ATTORNEYS

March 31, 1970  ICHIZO TSURUMOTO  3,503,430
ANNULAR SPRING LOCK WASHER
Filed Nov. 19, 1968  3 Sheets-Sheet 2

ICHIZO TSURUMOTO, INVENTOR

BY Wendroth, Lind & Ponack
ATTORNEYS

March 31, 1970 ICHIZO TSURUMOTO 3,503,430
ANNULAR SPRING LOCK WASHER
Filed Nov. 19, 1968 3 Sheets-Sheet 3

/ Energy due to transformation of curvature

∠ Energy due to expansion and contraction within the surface

ICHIZO TSURUMOTO,
INVENTOR

BY Wenderoth, Lind & Ponack

ATTORNEYs

United States Patent Office 3,503,430
Patented Mar. 31, 1970

3,503,430
ANNULAR SPRING LOCK WASHER
Ichizo Tsurumoto, 15, 15 Ban, 5-chome, Koshienguchi, Nishinomiya, Hyogo Prefecture, Japan
Filed Nov. 19, 1968, Ser. No. 777,082
Claims priority, application Japan, May 29, 1968, 43/36,894
Int. Cl. F16b 39/24
U.S. Cl. 151—38         5 Claims

ABSTRACT OF THE DISCLOSURE

A lock washer consisting of an annular spring body of conical shape and of a trapezoidal, cross section, carrying a hole at its center to accommodate a bolt passing therethrough and a slit made from the circumferential edge of the hole to the outer periphery, said spring body being made by coiling spirally a wire having the required cross-sectional shape around a spindle of the required diameter and by cutting it off at each pitch so that its fiber flow may show itself in its circumferential direction.

---

This invention relates to an annular spring lock washer designed for preventing bolts, nuts, screws and the like from getting loose.

Lock washers of a conventional type are manufactured by cutting them off a metallic plate. This involves much loss of material plate, which, coupled with complicated processes, makes such lock washers costly. Moreover, in the point of spring characteristics, lowering of pressure at the time of diminishing pressure is large in relation to "load-deflection" characteristics at the time of increasing pressure. Also, in respect of the distribution of stress, since the maximum stress acts on both the inner and outer peripheries, they are easy to break.

With the above in view, an annular spring lock washer in accordance with the present invention consists of an annular flat plate carrying a hole at its center to accommodate a bolt passing therethrough. This annular flat plate is formed by coiling a wire having the required cross-sectional shape so that its fiber flow may show itself in its circumferential direction, with a slit made at any desired position, from the inner periphery (the circumferential edge of the hole) to the outer periphery, on this basic form.

Figure 1:
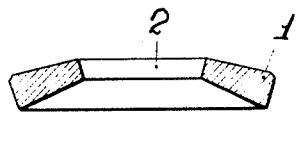
Figure 3:
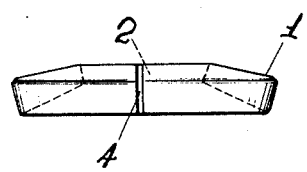
Figure 2:
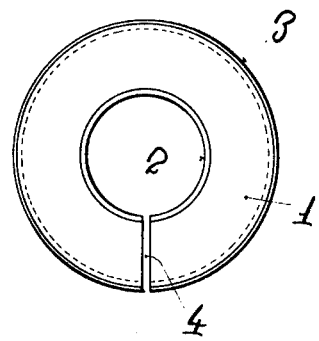
Figure 4:
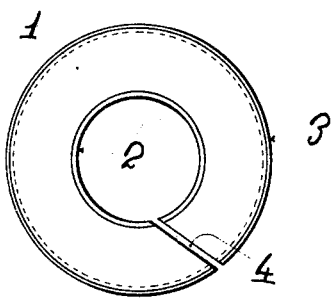
Figure 5:
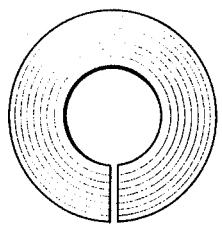
Figure 6:
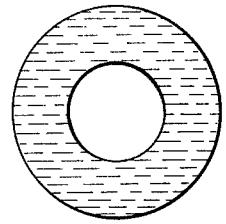
Figure 7:
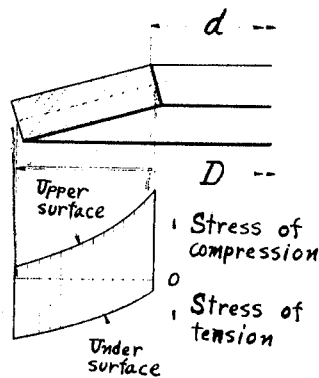
Figure 8:
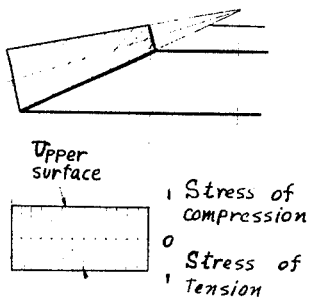
Figure 9:
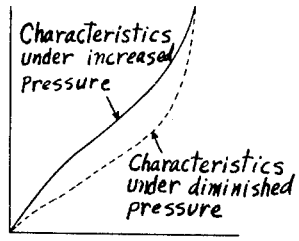
Figure 10:
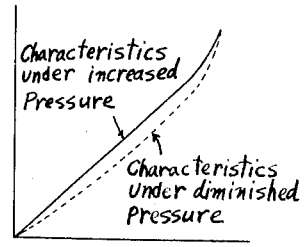
Figure 11:
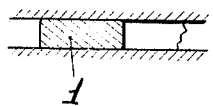
Figure 12:
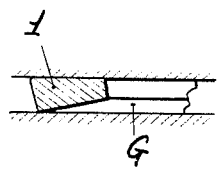
Figure 13:
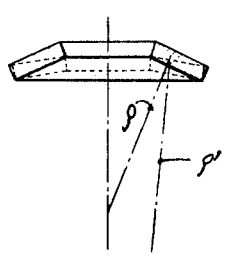
Figure 14:
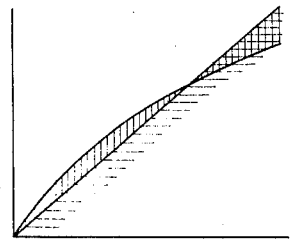
Figure 15:
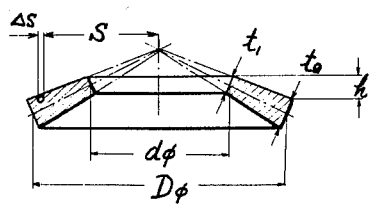

The nature and further advantages of this invention will be understood more clearly by the following description made with reference to the accompanying drawings in which:

FIG. 1 is a cross-sectional view of an annular spring lock washer having a trapezoidal section, FIG. 2 is a plan view of FIG. 1, FIG. 3 is an elevational view of an annular spring lock washer as shown in FIGS. 1 and 2, FIG. 4 is a plan view of an alternate form of the washer shown in FIGS. 1 and 2, FIG. 5 shows the fiber flow of an annular spring lock washer under the present invention, FIG. 6 shows the fiber flow of a conventional annular spring lock washer, FIG. 7 shows the distribution of stress in the case of the conventional annular spring lock washer, FIG. 8 shows the distribution of stress in the case of the present invention, FIG. 9 shows the characteristic curve, at the time of diminishing pressure, of the conventional annular spring lock washer, FIG. 10 shows the characteristic curve, at the time of diminishing pressure, of the annular spring lock washer under the present invention, FIG. 11 is a diagram of the conventional spring lock washer as it is pressed to the full, FIG. 12 is a diagram of the spring lock washer under the present invention as it is pressed to the full, FIG. 13 and FIG. 14 illustrate respectively the transformation of curvature under the present invention, and FIG. 15 is a basic drawing of the equation of load.

FIGS. 1 and 2 show respectively a representative embodiment of the present invention, in which numeral 1 denotes an annular spring lock washer body. This body 1 consists of a flat annular plate carrying at its center a hole 2 to accommodate a bolt passing therethrough, with its surface gradually rising up from the outer periphery 3 toward the inner periphery (the circumferential edge of the hole) 2 so that the whole body may have a conical shape. This represents the fundamental shape of the washer according to the present invention. This washer body is so made as to form a trapezoidal section with its thickness growing smaller toward the hole 2. A slit 4 is made from a part of the circumferential edge of the hole 2 of this body to the outer peripheral edge 3, either on the diametrical line of the body or to a direction angular thereto as shown in FIG. 4. Washers of this shape are the simplest and the most useful of all embodiments of this invention. FIGS. 3 and 4 show respectively an elevation view of the first embodiment, and a slightly different embodiment, in the latter of which an angular slit is so made as to intersect more nearly on a tangent with the center hole.

Referring now to the method of manufacturing annular spring lock washers of these two embodiments, a long flat wire having the desired sectional shape is coiled spirally around a spindle of the prescribed outside diameter and is then cut off at each pitch. Two cut ends of each pitch are set opposite to each other in such a fashion that a gap between them may form a slit 4. The washer body 1 made according to this method shows its fiber flow in its circumferential direction as shown by FIG. 5 (shown by thin lines) and accordingly its fiber flow corresponds with the direction of stress, in other words, stress at every portion of the section of an annular spring body works in the direction of its fiber flow, making it possible to design the allowable stress to a higher degree. On the contrary, since the conventional annular spring washer body is formed by cutting it off a metallic plate, its fiber flow varies with each portion as shown by FIG. 6, involving portions where they intersect the maximum stress at right angles and making it impossible to design the allowable stress to a high degree for those portions, with the result that the washer cannot stand a high pressure.

FIG. 7 shows the distribution of stress at the section of the conventional annular spring lock washer.

In the case of the conventional annular spring lock washer, the distribution of stress is such that the maximum stress of compression works on the upper surface of the inside diameter $d$ and the maximum stress of tension works on the under surface of the outside diameter $D$. Accordingly, there is a fear that the washer is broken by the maximum stress of compression or tension which works locally. On the contrary, the spring lock washer body under the present invention having a slit and a trapezoidal section involves the uniform distribution of stress of the section as shown in FIG. 8, i.e. uniform stress against the value of allowable stress of the spring washer (in the case of the conventional spring washer, the distribution of stress is influenced by the maximum stress at the outer periphery and at the inner periphery), making it possible to design the stress 100% effectively, with the result of very high efficiency of energy.

In respect of "load-deflection" characteristics, the conventional annular spring washer shows a considerable lowering of characteristics under diminished pressure and there is shown a big difference between the characteristic under diminished pressure and that under increased pressure (FIG. 9), whereas the spring lock washer according to the present invention shows a very small difference between the characteristic under increased pressure and that under diminished pressure as shown by FIG. 10. To be more concrete, in cases where the spring washer is pressed to the full (spring washer body is flattened as illustrated by FIGS. 11 and 12), since the conventional spring washer has no slit and its upper side is in parallel with its under side, its fulcrum is a plane where big errors are caused in characteristics. In the case of the spring lock washer under the present invention having a trapezoidal section, since it has a gap G at the underside of the spring body, its characteristics correspond with the calculated values and the difference between the characteristic under increased and the characteristic under diminished pressure is very small. In the case of the conventional spring lock washer, the load on it involves reaction due to the transformation of curvature of the annular spring body and the change in expansion and contraction within the surface.

In the case of the special spring washer under the present invention, the transformation of curvature which influences only a limited part of the load as illustrated by FIGS. 13 and 14 is as shown below:

Transformation of curvature:

$$\frac{1}{\rho} - \frac{1}{\rho'}$$

where:

$\rho$=curvature at time of free state
$\rho'$=curvature at time of processing

However, the spring washer under the present invention is characterized in that stress and reaction due to the transformation of curvature are made zero by means of a slit provided in the washer body, i.e. by giving a slit to the body it is made possible to reduce the required material weight to the minimum with little change in power.

FIG. 15 illustrates the following equation of load under the present invention.

Equation of load:

$$P = \frac{\pi E \delta}{6(1-v^2)\left(\frac{D-d}{2}\right)^2} \int_{d/2}^{D/2} \times \frac{t o}{\left(\frac{D}{2}\right)^3} \times S^2 \Delta S$$

or $$P = \frac{\pi E t o^3 \left\{1-\left(\frac{d}{D}\right)^3\right\} \delta}{18(1-v^2)\left(\frac{D-d}{2}\right)^2}$$

where:

P=Load (kg.).
E=Vertical elastic coefficient (kg./mm.²).
$\delta$=Amount of deformation of spring body (mm.).
$v$=Poisson's ratio of steel.

Equation of stress:

$$\sigma = \frac{E\delta}{2(1-v^2)\left(\frac{D-d}{2}\right)} \times \frac{t}{S}$$

$$\sigma = \frac{E\delta}{2(1-v^2)\left(\frac{D-d}{2}\right)} \times \frac{t o}{\frac{D}{2}} \quad \text{(Outermost periphery)}$$

or $$\sigma = \frac{E\delta}{2(1-v^2)\left(\frac{D-d}{2}\right)} \times \frac{t}{\frac{d}{2}} \quad \text{(Innermost periphery)}$$

where:

$\sigma$=Stress at the section (kg./mm.²).

The present invention has such advantages that it provides easy adjustment of the load-deflection characteristics, can design the maximum stress of the inner periphery to a higher degree because the load fulcrum at the inner periphery of the washer moves toward the outer periphery, and can obtain the spring constant of the desired high degree.

Having thus described the nature of the present invention, what I claim is:

1. A lock washer consisting of an annular spring body of conical shape and of a trapezoidal cross section, having a hole at its center to accommodate a bolt passing therethrough and having its upper and lower surfaces rising up gradually from the outer periphery toward the inner periphery thereof, the surfaces defining said inner and outer peripheries being parallel, and said upper and lower surfaces converging in the direction of said inner periphery, whereby the thickness of said body uniformly decreases from said outer periphery to said inner periphery and having a slit at any desired position extending from said inner periphery of the hole to said outer periphery, said spring body being formed by coiling a wire having the same cross-sectional shape as the cross section of the spring washer body so as to make its fiber flow show in its circumferential direction.

2. A lock washer as defined in claim 1 wherein the parallel surfaces defining said inner and outer peripheries are disposed angularly relative to a plane surface upon which said washer would seat, both when in a free and substantially compressed condition.

3. A lock washer consisting of an annular spring body of conical shape and of a trapezoidal cross section, having a hole at its center to accommodate a bolt passing therethrough and having its upper and lower surfaces rising up gradually from the outer periphery toward the inner periphery thereof, the surfaces defining said inner and outer peripheries being parallel, and said upper and lower surfaces converging in the direction of said inner periphery, whereby the thickness of said body uniformly decreases from said outer periphery to said inner periphery, and having a slit at any desired position extending from said inner periphery of the hole to said outer periphery.

4. A lock washer as defined in claim 3 wherein said spring body is formed by coiling a wire having its fiber linearly disposed and having the same cross-sectional shape as the cross-section of the spring washer body whereby when so formed, its fiber shows in a circumferential direction.

5. A lock washer as defined in claim 3 wherein the parallel surfaces defining said inner and outer peripheries are disposed angularly relative to a plane surface upon which said washer would seat, both when in a free and substantially compressed condition.

References Cited

UNITED STATES PATENTS

| | | | |
|---|---|---|---|
| 329,738 | 11/1885 | Harvey | 151—36 |
| 1,320,259 | 10/1919 | Martens | 151—38 |
| 1,999,082 | 4/1935 | Buechting | 151—36 X |
| 2,781,687 | 2/1957 | Knocke | 85—50 X |
| 3,016,941 | 1/1962 | Coldren | 151—38 |

RAMON S. BRITTS, Primary Examiner